United States Patent
Umehara et al.

(10) Patent No.: US 9,525,379 B2
(45) Date of Patent: Dec. 20, 2016

(54) CONTROL METHOD FOR VIBRATION GENERATOR AND VIBRATION GENERATOR

(71) Applicant: Minebea Co., Ltd., Kitasaku-gun, Nagano (JP)

(72) Inventors: Mikio Umehara, Yonago (JP); Yutaka Kamogi, Fukuroi (JP)

(73) Assignee: Minebea Co., Ltd., Kitasaku-gun (JP)

( * ) Notice: Subject to any disclaimer, the term of this patent is extended or adjusted under 35 U.S.C. 154(b) by 11 days.

(21) Appl. No.: 14/730,673

(22) Filed: Jun. 4, 2015

(65) Prior Publication Data
US 2015/0357958 A1 Dec. 10, 2015

(30) Foreign Application Priority Data
Jun. 4, 2014 (JP) .................................. 2014-116276

(51) Int. Cl.
*H01F 7/00* (2006.01)
*H02P 25/02* (2016.01)

(52) U.S. Cl.
CPC ........... *H02P 25/027* (2013.01); *H02P 25/032* (2016.02)

(58) Field of Classification Search
CPC ............ H01F 7/00; H01F 7/122; H01F 21/00; H01F 21/04
USPC ... 318/451, 128, 460; 331/156; 335/90, 235, 335/252; 356/26; 336/100, 110, 115; 338/16
See application file for complete search history.

(56) References Cited

U.S. PATENT DOCUMENTS 8,139,279 B2 * 3/2012 Nishizawa ........... G02B 26/105
359/224.1

FOREIGN PATENT DOCUMENTS

| JP | 2009-101343 A | | 5/2009 | |
| JP | 2009101343 A | * | 5/2009 | ........... G02B 26/105 |
| JP | 2010-051946 A | | 3/2010 | |

* cited by examiner

*Primary Examiner* — Antony M Paul
(74) *Attorney, Agent, or Firm* — Masuvalley & Partners

(57) ABSTRACT

A control method for a vibration generator is provided. The vibration generator includes a fixed part around which a coil is wound, a movable part having a magnet, a bridge part movably supporting the movable part, and a power supply unit which applies an alternating current of a predetermined frequency to the coil. The power supply unit starts at the time of startup by the alternating current with a starting frequency which differs from a resonance frequency of the movable part, and the power supply unit changes the frequency of the applied alternating current to the resonance frequency of the movable part when the amount of vibration at the starting frequency reaches a predetermined ratio with respect to a saturation vibration amount of the resonance frequency.

4 Claims, 8 Drawing Sheets

FIG. 5

| Frequency (Hz) | Startup Time (ms) | Vibration Amount (G) | Startup Speed (G/ms) | Estimated Startup Time (ms) |
|---|---|---|---|---|
| 127.6 | 10.5 | 0.78 | 0.07 | 25.88 |
| 136.9 | 19.5 | 1.43 | 0.07 | 25.18 |
| 142.5 | 27.5 | 1.83 | 0.07 | 27.27 |
| 144.2 | 30.5 | 1.92 | 0.06 | 28.99 |
| 145.9 | 34.5 | 1.99 | 0.06 | 31.91 |
| 146.8 | 31.5 | 1.98 | 0.06 | 29.05 |
| 147.6 | 30.5 | 1.96 | 0.06 | 28.39 |
| 149.5 | 27 | 1.82 | 0.07 | 27.00 |
| 150.4 | 24 | 1.75 | 0.07 | 24.98 |
| 153.2 | 17.5 | 1.54 | 0.09 | 21.55 |
| 157.1 | 14 | 1.36 | 0.10 | 20.74 |
| 166.8 | 8.5 | 1.03 | 0.12 | 20.21 |

*

CONTROL METHOD FOR VIBRATION GENERATOR AND VIBRATION GENERATOR

RELATED APPLICATIONS

This application claims priority under 35 U.S.C. §119 from Japanese patent application Serial No. 2014-116276, filed Jun. 4, 2014, entitled "Control method for vibration generator and vibration generator," which is incorporated herein by reference in its entirety.

FIELD OF THE INVENTION

The present invention pertains to a control method for a vibration generator and a vibration generator, which generates a vibration through a linear motor.

BACKGROUND

Conventionally, vibration generators which use a linear motor are known (for example, see Japanese Unexamined Patent Application Publication No. 2010-51946 (hereinafter referred to as Patent Document 1) and Japanese Unexamined Patent Application Publication No. 2009-101343 (hereinafter referred to as Patent Document 2). A linear motor (vibration generator) disclosed in Patent Document 1 has a fixed part having spiral shaped current lines, and a movable part provided so as to be movable along the surface of the spiral shaped current lines. The current lines have a pair of spiral shaped flat coils, and the movable part has a magnetic pole face opposing the current lines. Moreover, the fixed part is provided with plate springs with which the movable part collides when it moves. In this manner, slimmer linear motors, and a reduction in the response time (startup time) until a predetermined amount of vibration is reached are being achieved.

Moreover, an oscillating member device (vibration generator) disclosed in Patent Document 2 has an oscillating system including at least one oscillating member supported so as to be capable of oscillating and having a resonance frequency, a driving means for driving the oscillating system, and detecting means for detecting the resonance frequency of the oscillating system. Furthermore, the oscillating member device also has a driving control means that changes a driving frequency of a driving signal that is applied to the driving means in accordance with the resonance frequency of the oscillating system, and a memory means that stores a frequency detected by the detecting means at a first predetermined timing. After the frequency is stored by the memory means, the driving control means sets the driving frequency with reference to the stored frequency at a second predetermined timing to perform driving control. In this manner, the possibility that a driving signal will be produced at a frequency near the resonance frequency can be increased, and the startup time can be shortened.

SUMMARY OF THE INVENTION

With the above-described prior art of Patent Document 1 and Patent Document 2, both cases are premised on startup at a resonance frequency. Therefore, startup time is reduced by detecting deviations in resonance frequency due to changes in the startup speed, stored resonance frequency, and environment. However, the problem with this type of method is that the counter-electromotive force is maximized because free vibration at the resonance frequency is large, and as a result, the problem of requiring time for startup cannot be resolved.

The present invention was achieved to solve the conventional problems, and an object of the present invention is to provide a control method for a vibration generator and a vibration generator, which can shorten the startup time until a steady amount of vibration is reached at a resonance frequency of a movable part.

(1) One aspect pertaining to the invention of the present application is to provide a method for controlling a vibration generator, the vibration generator including a fixed part around which a coil is wound, a movable part having a magnet, a bridge part movably supporting the movable part, and a power supply unit which applies an alternating current of a predetermined frequency to the coil, wherein the power supply unit starts at the time of startup by the alternating current with a starting frequency which differs from a resonance frequency of the movable part, and the power supply unit changes the frequency of the applied alternating current to the resonance frequency of the movable part when the amount of vibration at the starting frequency reaches a predetermined ratio with respect to a saturation vibration amount of the resonance frequency.

(2) With the control method for a vibration generator according to the above-described (1), the starting frequency may be larger than the resonance frequency.

(3) With the control method for a vibration generator according to the above-described (1) or (2), the frequency of the alternating current may be changed to the resonance frequency of the movable part before the amount of vibration at the starting frequency reaches the saturation vibration amount.

(4) One aspect pertaining to the invention of the present application is to provide a vibration generator including a fixed part around which a coil is wound, a movable part having a magnet, a bridge part movably supporting the movable part, and a power supply unit for inputting at the time of startup an alternating current applied to the coil at a starting frequency which differs from a resonance frequency of the movable part, and changing the frequency of the applied alternating current to the resonance frequency of the movable part when the amount of vibration at the starting frequency reaches a predetermined ratio with respect to a saturation vibration amount of the resonance frequency.

With the present invention, at the time of startup, an alternating current of a starting frequency that differs from the resonance frequency is applied to the coil for startup. Moreover, when the amount of vibration at the starting frequency reaches a predetermined ratio with respect to the saturation vibration amount, the power supply unit changes the frequency of the applied alternating current to the resonance frequency. Through this, a vibration generator control method and a vibration generator having an effect of being capable of improving the startup speed and reducing the startup time until a steady amount of vibration is reached can be provided.

BRIEF DESCRIPTION OF THE DRAWINGS

FIG. 5 is a table showing startup times and amounts of vibration with respect to frequency;

DETAILED DESCRIPTION OF THE INVENTION

Figure 1:
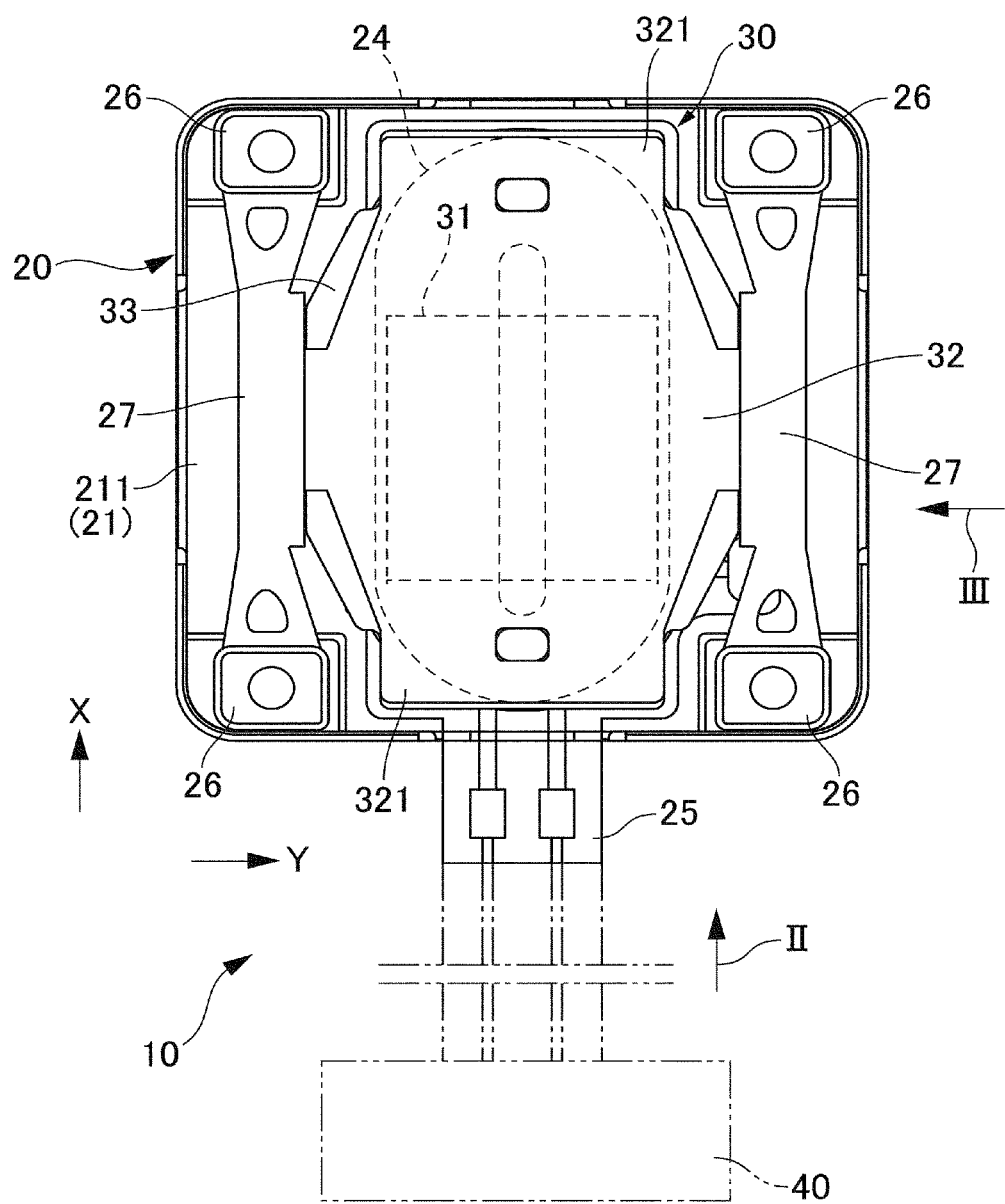
FIG. 1 is a plan view of a vibration generator of an embodiment according to the present invention with a lid member being transparent.
Figure 2:
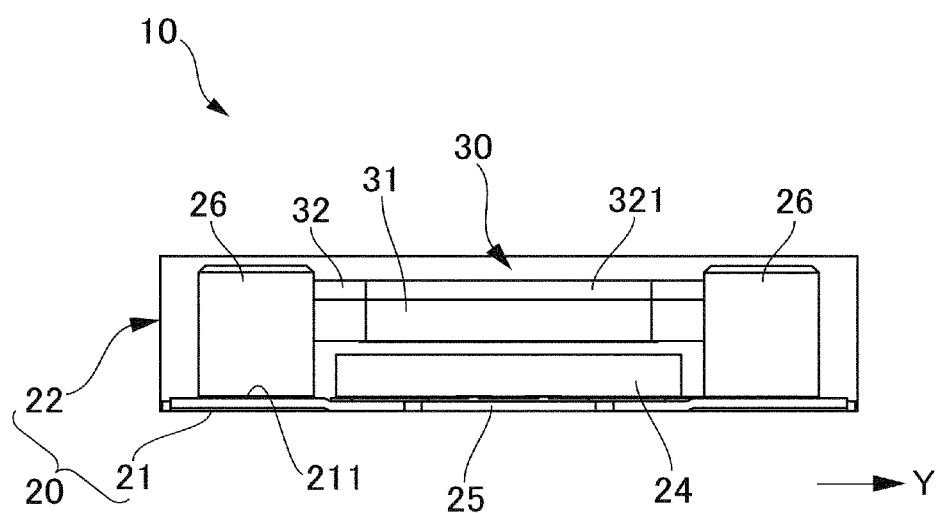
FIG. 2 is a front elevation view as viewed from a direction II in FIG. 1.
Figure 3:
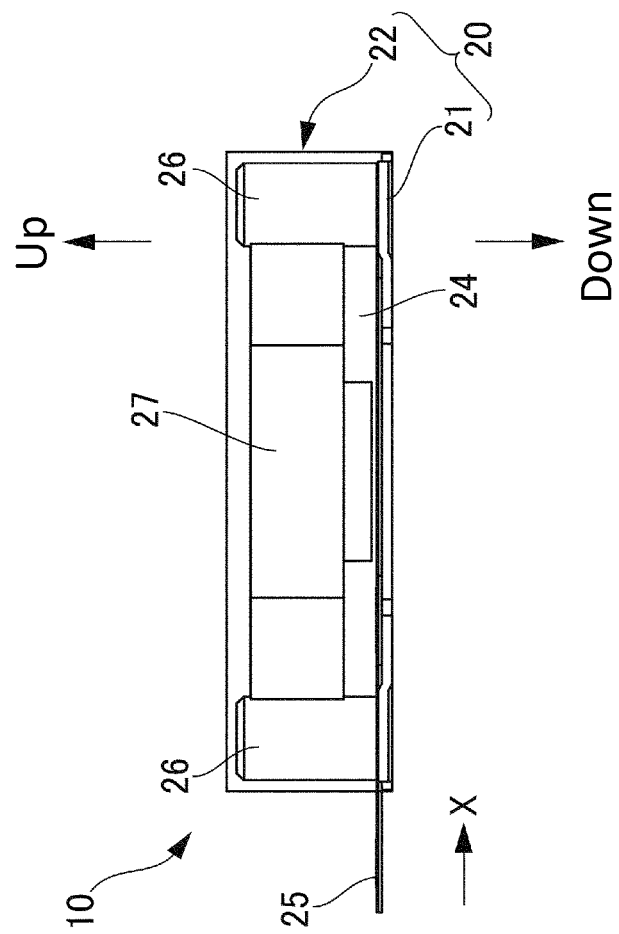
FIG. 3 is a side view as viewed from a direction III in FIG. 1.

A vibration generator of an embodiment according to the present invention is described below using the drawings. As shown in FIG. 1 to FIG. 3, a vibration generator 10 can be attached, for example, to a mobile device or the like, and used with a device that notifies of reception through vibration, or with a haptic function of a liquid crystal touch panel. The vibration generator 10 has a low-profile, box-shaped housing 20 that is rectangular with a short height. The housing 20 has a base plate (fixed part) 21 attachable to a mobile device or the like and a rectangular box-shaped lid member 22 that is open at the bottom and covers the base plate 21 from above.

A wound coil 24 is attached to a top surface 211 of the base plate 21. The coil 24 is wound in a single roughly oval shape from a planar view, being long in a single direction of the base plate 21 and having a width that is somewhat narrow in multiple directions. Note that in the description below, the longitudinal direction of the coil is referred to as the "X-direction," and the direction orthogonal to the X-direction is referred to as the "Y-direction (or left-right direction)." Moreover, an upward direction in FIG. 3 that is orthogonal to the X-direction and the Y-direction is referred to as "Up," and the opposite side is referred to as "Down." A flexible printed circuit (FPC) 25 extending from one end in the X-direction of the coil 24 to the outside of the housing 20 is provided. The FPC 25 is connected to a power supply unit 40, and applies an alternating current to the coil 24 to drive it. Note that the number of coils 24 and shape thereof are not limited thereto. For example, a plurality of coils having a circular or rectangular shape from a planar view can be used.

A columnar member 26 is attached in each of the four corners of the top surface 211 of the base plate 21. Here, the columnar member 26 has a rectangular cross-section, but any optional cross-sectional shape may be used such as a circle, oval, or regular polygon. A bridge part 27 is connected between columnar members 26 along the X-direction. The bridge part 27 is provided at an upper part of the columnar members 26 (upper part in FIG. 3). In other words, the pair of bridge parts 27 is separated in an upward direction from the top surface 211 of the base plate 21, and the bridge parts 27 are provided in parallel opposing each other. The bridge parts 27 elastically deform primarily in the Y-direction. The columnar members 26 and the bridge parts 27 are formed using, for example, silicone rubber for heat-resistance applications, and overall, they function as a rubber spring.

A vibrator (movable part) 30 is attached between the pair of bridge parts 27. Accordingly, the vibrator 30 is movably supported by the bridge parts 27. The vibrator 30 has a magnet 31 which is a thin, rectangular plate shaped permanent magnet. The magnet 31 is provided with a back yoke 32, which is a magnetic part, and a weight 33 in order to prevent flux leakage and maximally draw out the magnetic force of the magnet. The back yoke 32 covers the top surface of the magnet 31, and has projections 321, 321 which project from an end of the coil 24 in the X-direction to the outside. In other words, the vibrator 30 is formed by integrally connecting the magnet 31, the back yoke 32, and the weight 33.

Both ends in the Y-direction of the vibrator 30 are attached to the bridge parts 27. At this time, the projections 321 of the back yoke 32 are formed between right and left columnar members 26 to a size that forms a certain amount of gap between the projections 321 and the columnar members 26. The vibrator 30, bridge parts 27, and columnar members 26 can be integrally formed through insert molding. Accordingly, by attaching the columnar members 26 to the top surface 211 of the base plate 21, the vibrator 30 is arranged above the coil 24 so as to be movable primarily in the Y-direction, facing in parallel the top surface of the coil 24.

The power supply unit 40 can change the frequency of the applied alternating current, and applies an alternating current of a predetermined frequency to the coil 24 via the FPC 25. The coil 24 to which the alternating current has been applied generates a magnetic field to cause reciprocating movement of the vibrator 30 with respect to the coil 24. In other words, when an electric current flows in the coil 24, the coil 24 is excited, and a magnetic field is produced in the vertical direction. When a magnetic field is produced, the magnet 31 is affected by the magnetic field thereof, and repelling and attractive forces (thrust force) are generated. Through this, a force that causes displacement in the right or left direction depending on the direction of the magnetic field and the arrangement of the magnetic pole of the magnet 31 can be acted on the vibrator 30.

The vibrator 30 moves while causing elastic deformation of the bridge parts 27, and thus when the amount of movement thereof becomes large, the elastic recovery force oriented in the opposite direction also increases. In addition, when the thrust force becomes weak, the vibrator 30 attempts to return to its original position (position when an electric current is not applied) through the elastic recovery force of the bridge part 27. Accordingly, by applying an electric current to the coil 24, the vibrator 30 reciprocally displaces in the right and left directions (in other words, it vibrates) while causing the bridge parts 27 to bend. Note that because the projections 321 of the back yoke 32 are sandwiched between the right and left columnar members 26, the amount that the back yoke 32 can move is limited. Therefore, excessive movement of the vibrator 30 is prevented, and it can be restricted to a predetermined amount of vibration.

Figure 4:
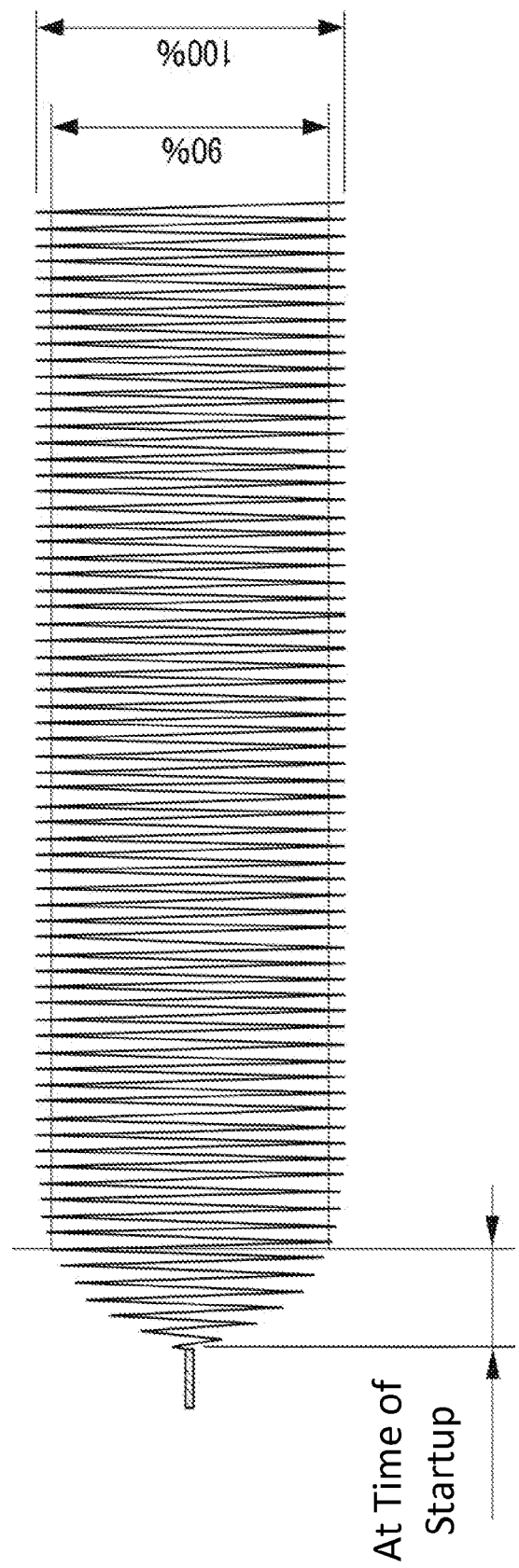
FIG. 4 is a graph showing a drive voltage waveform.
Figure 6:
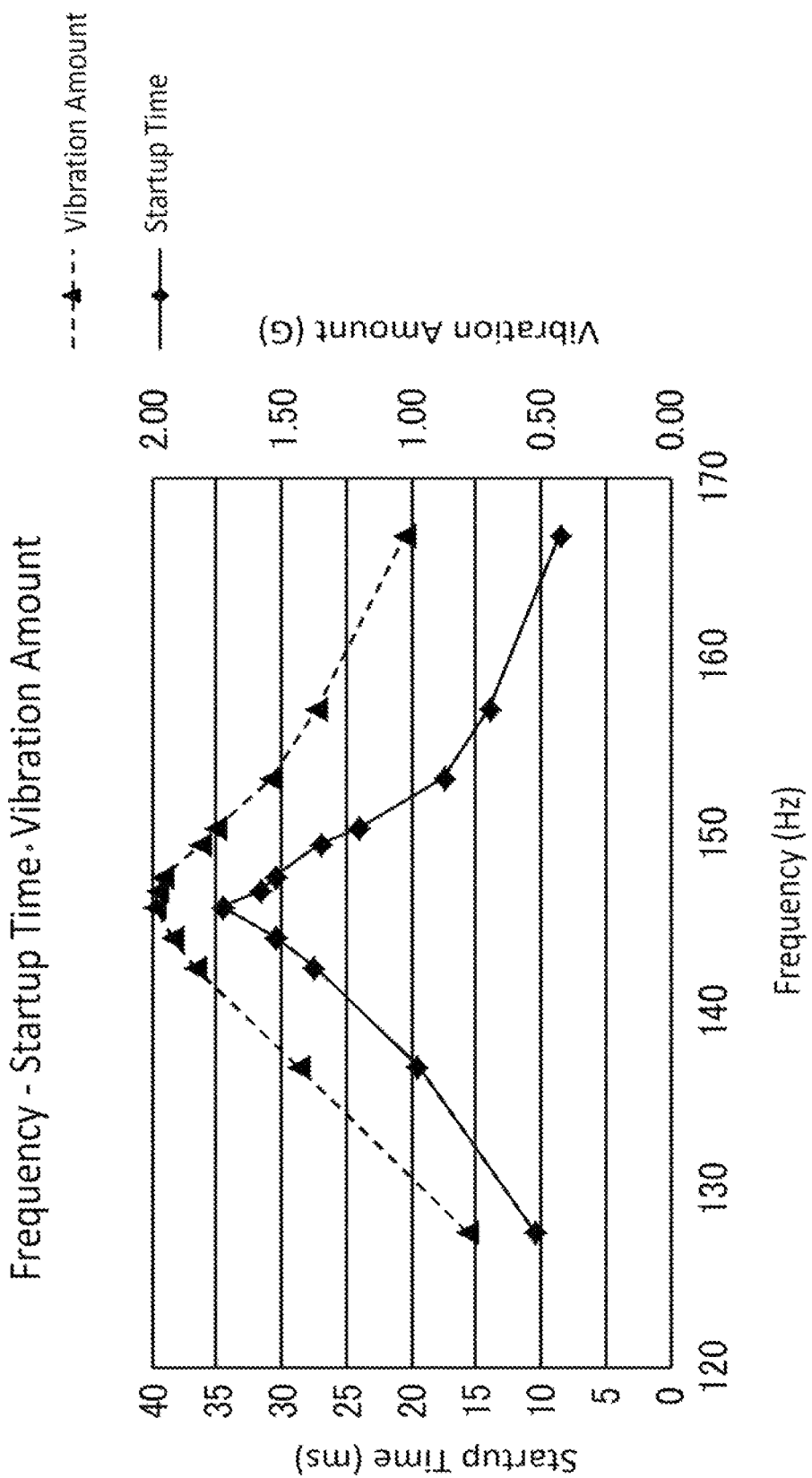
FIG. 6 is a graph showing the startup times and amounts of vibration of the table of FIG. 5.

Next, a control method for the vibration generator is described. The power supply unit 40 starts at the time of startup by applying to the coil 24 an alternating current having a starting frequency which differs from an inherent resonance frequency of the vibrator 30 supported by the bridge part 27. Here, as shown in FIG. 4, the phrase "at the time of startup" can be defined as the time it takes until the amount of vibration reaches, for example, 90% of the saturation vibration amount (hereinafter, "steady amount of vibration") at the resonance frequency of the vibrator 30. FIG. 5 and FIG. 6 show the startup time and amount of vibration when driven at a frequency near the resonance frequency. As shown in FIG. 5 and FIG. 6, when the starting frequency is 145.9 (Hz), which is the resonance frequency (shown by the * mark in FIG. 5), the startup time is 34.5 (ms), and the amount of vibration is 1.99 (G), and both of these values are maximum values. Furthermore, when the starting frequency is shifted away from the resonance frequency, it is clear that the startup time becomes faster, and the amount of vibration decreases.

Here, the startup speed is confirmed using the amount of vibration and startup time determined from FIG. 5 and FIG. 6. The startup speed can be calculated from the following equation.

$$\text{Startup Speed} = \frac{\text{Amount of Vibration}}{\text{Startup Time}} \quad \text{[Equation 1]}$$

Figure 7:
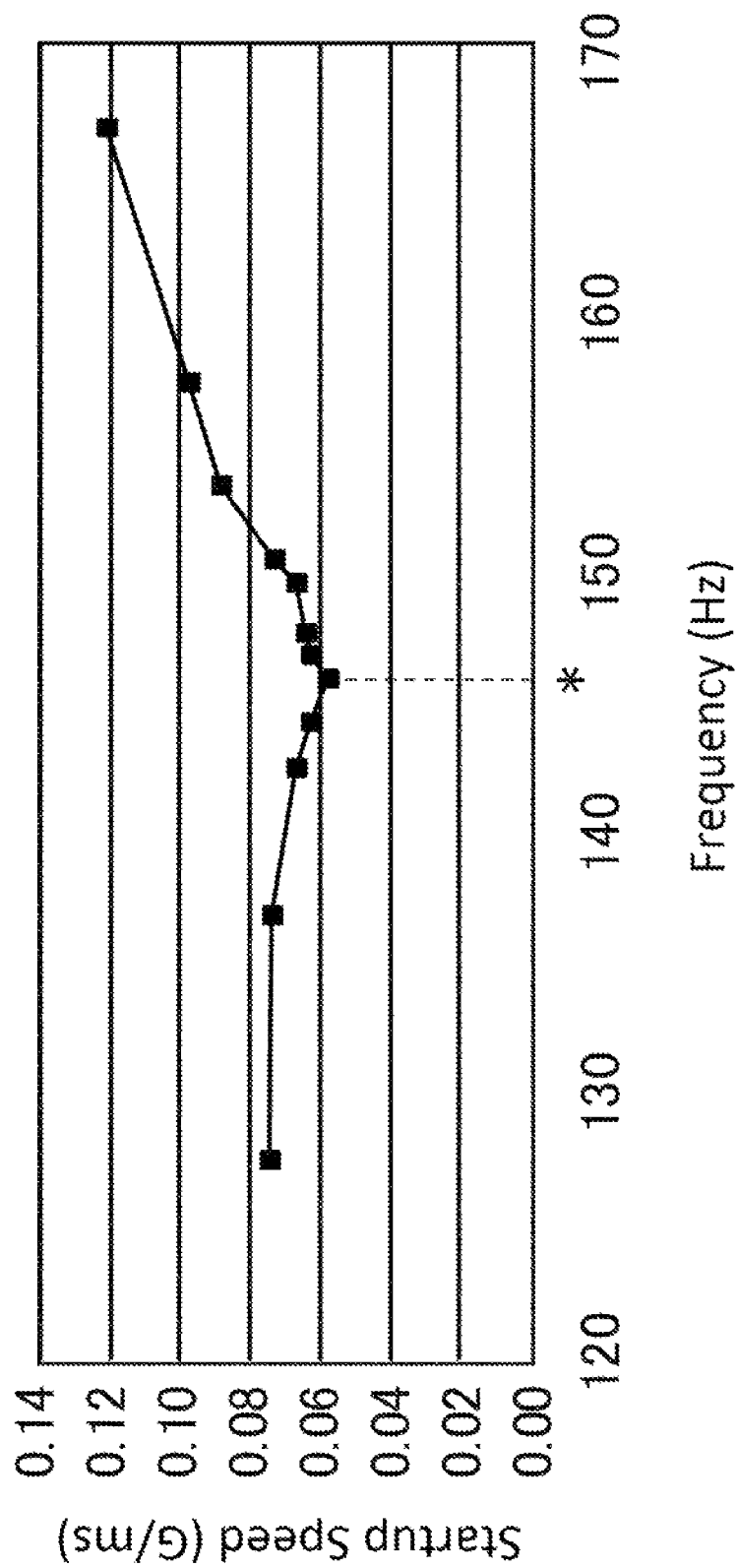
FIG. 7 is a graph showing the relationship between frequency and startup time.

FIG. 7 shows the startup speed with respect to each frequency. As shown in FIG. 7, it is clear that driving at a frequency that is separated from the resonance frequency results in a larger value for the startup speed. It is also clear that driving at a high frequency in particular results in a large value for the startup speed (rise is fast).

Next, the estimated startup time when a switch is made to startup through the resonance frequency at the point in time when the amount of vibration becomes saturated when starting at an initially applied frequency that differs from the resonance frequency can be obtained by the following equation.

$$\text{Estimated Startup Time} = \frac{\text{Amount of Vibration}}{\text{Startup Speed}} + \frac{\text{Amount of Vibration at the Resonance Frequency} - \text{Amount of Vibration}}{\text{Startup Speed at the Resonance Frequency}} \quad \text{[Equation 2]}$$

In other words, the estimated startup time is the sum of the startup time at the frequency at the time of initial application and the startup time after the frequency has changed to the resonance frequency.

Figure 8:
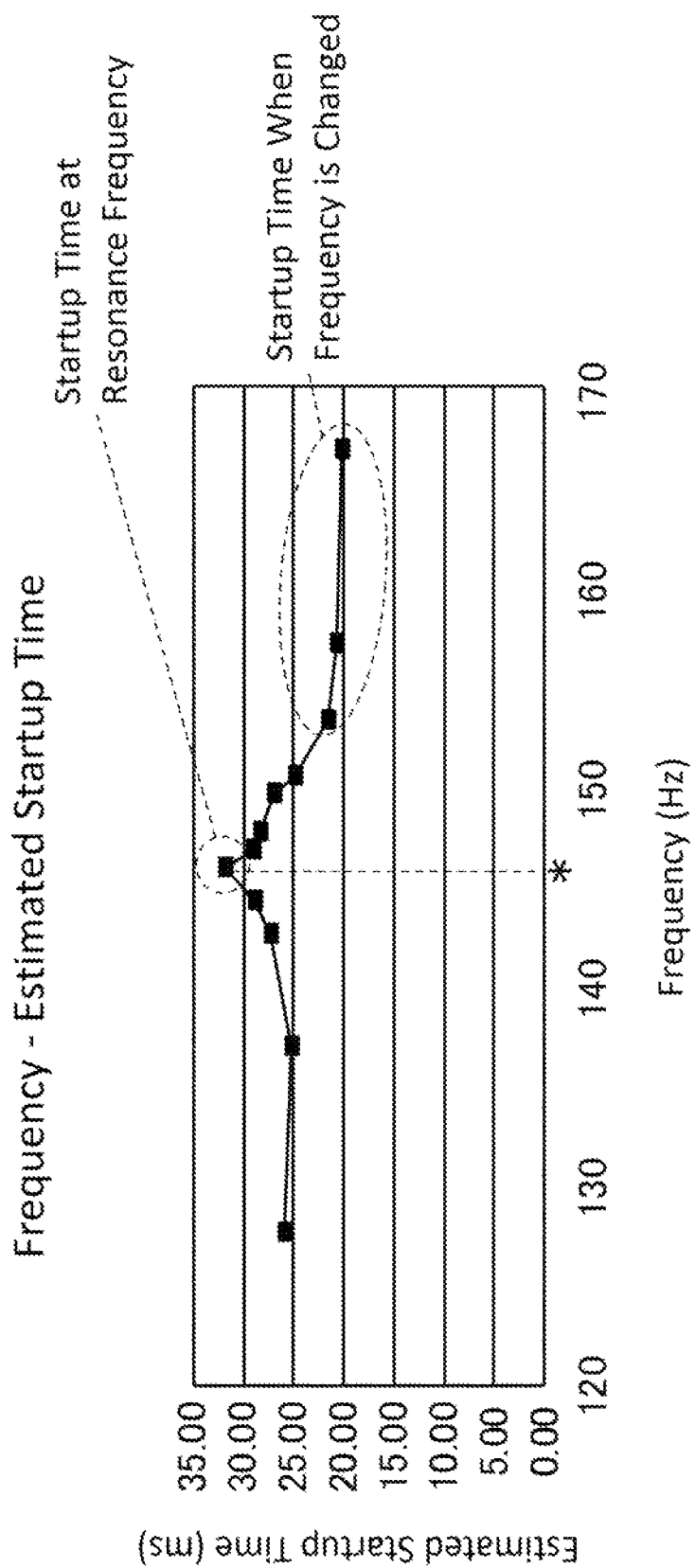
FIG. 8 is a graph showing the relationship between frequency and estimated startup time.

FIG. 8 shows the estimated startup time with respect to each starting frequency. As shown in FIG. 8, when beginning startup, the device is driven by a frequency (near 160 Hz in this case) that is higher than the resonance frequency, and driving is switched to the resonance frequency when the amount of vibration is close to reaching a steady amount of vibration. Through this, the startup speed when beginning startup becomes larger (see FIG. 7), and thus the estimated startup time can be shortened.

Next, specific examples of the control method are described.

Specific Example 1

Method for Setting Frequencies Individually when Shipping

1. Measure the resonance frequency of the vibration generator 10 when shipping from the factory, and store the resonance frequency and a starting frequency that is a fixed ratio higher than that resonance frequency in the memory of the power supply unit 40, which is the control unit. For example, a frequency that is 5% (several Hz) higher than the resonance frequency can be stored as the starting frequency.

2. Separately measure the time that it takes for the amount of vibration to become saturated when starting at the starting frequency determined in advance in step 1, and as the frequency switching time, store a time that is shorter by a fixed amount than the time it takes for the amount of vibration to become saturated in the memory of the power supply unit 40. For example, because the saturation vibration amount of the starting frequency is larger than the steady amount of vibration with respect to the resonance frequency, the frequency switching time can be set to a time such that the steady amount of vibration is not exceeded.

3. After the time stored in step 2 has passed, drive at the resonance frequency.

Specific Example 2

Automatic Resonance Tracking Method

1. When the power is turned on for a device (for example, a mobile device), drive the vibration generator 10 one time, and automatically detect the resonance frequency.

2. Store the resonance frequency in the memory of the power supply unit 40.

3. When driving the actual vibration generator 10, drive it at a starting frequency that is higher than the resonance frequency. For example, a frequency that is 5% higher than the resonance frequency can be stored in memory as the starting frequency.

4. After driving the vibration generator 10 at the starting frequency for a certain amount of time, drive it in an automatic resonance tracking mode.

Note that as the certain amount of time, an optimum amount of time (fixed value) can be determined in advance and stored in the memory of the power supply unit 40. Or another method is to drive the vibration generator 10 one time at the determined resonance frequency when the power to a product is turned on, measure the startup time, and then drive the vibration generator 10 at a frequency that is higher than the resonance frequency such that the time becomes a certain percentage of that startup time (for example, 90%). In addition, the induced voltage can be monitored in an automatic resonance frequency tracking mode, and control can be implemented such that the induced voltage and driving waveform are synchronized.

Specific Example 3

Method for Fixing at Constant Values

1. Determine optimum values overall in advance as fixed values for the starting frequency, time, and resonance frequency.

2. Drive the vibration generator 10 at the determined fixed values.

The operational effects of the control method for the vibration generator 10 of the present embodiment are described. The vibration generator 10 has a base plate 21 on which a coil 24 is wound, a vibrator 30 having a magnet 31, a bridge part 27 movably supporting the vibrator 30, and a power supply unit 40 which applies an alternating current of a predetermined frequency to the coil 24. The power supply unit 40 starts at the time of startup by applying to the coil 24 an alternating current of a starting frequency which differs from the resonance frequency of the vibrator 30. When the amount of vibration reaches a predetermined ratio with respect to a saturation vibration amount of the starting frequency, the power supply unit 40 changes the frequency of the applied alternating current to the resonance frequency of the vibrator 30.

In other words, the startup time until a steady amount of vibration of the resonance frequency of the vibrator 30 is reached is a sum of the time it takes to reach an amount of vibration of a predetermined ratio with respect to a saturation vibration amount of the starting frequency, and after that, the time it takes to reach a steady amount of vibration through the resonance frequency. Accordingly, the startup speed is improved by using a starting frequency that differs from the resonance frequency, and the startup time until an amount of vibration of a predetermined ratio with respect to the saturation vibration amount of the starting frequency is reached is shortened. Through this, the startup time until reaching a steady amount of vibration at the resonance frequency of the vibrator 30 can be reduced.

A demand exists particularly for a short startup time in order to convey a sense of touching a panel by vibration for a haptics function that obtains cutaneous sensory feedback by providing force, vibration, movement, or the like to a user. Accordingly, the sensation can be significantly improved by reducing the startup time. Moreover, a method of applying a high voltage at the time of startup is also conceivable, but in this case, the voltage must be boosted, and thus special circuitry is required. On the other hand, with the present invention, the startup time can be easily reduced by merely controlling the switching of frequencies, and thus the addition of a separate circuit is not required, and an increase in cost can be avoided.

Moreover, the time required to reach an amount of vibration of a predetermined ratio with respect to the saturation vibration amount of the starting frequency is shortened by making the starting frequency larger than the resonance frequency. Through this, the startup time required to reach a steady amount of vibration at the resonance frequency of the vibrator 30 can be shortened.

Furthermore, before the amount of vibration at the starting frequency reaches the saturation vibration amount, the power supply unit 40 changes the frequency of the alternating current to the resonance frequency of the vibrator 30. Through this, the matter of the amount of vibration becoming too large can be prevented. Moreover, because the occurrence of time until an amount of vibration that has become too large returns to a steady amount of vibration at the resonance frequency of the vibrator 30 can be prevented, the startup time can be shortened.

The operational effects of the vibration generator 10 of the present embodiment are described. The vibration generator 10 has a base plate 21 on which a coil 24 is wound, a vibrator 30 having a magnet 31, a bridge part 27 movably supporting the vibrator 30, and a power supply unit 40 which applies an alternating current of a predetermined frequency to the coil 24. The power supply unit 40 starts at the time of startup by applying an alternating current of a starting frequency which differs from the resonance frequency of the vibrator 30. When the amount of vibration reaches a predetermined ratio with respect to a saturation vibration amount of the starting frequency, the power supply unit 40 changes the frequency of the applied alternating current to the resonance frequency of the vibrator 30.

In other words, the startup time until a steady amount of vibration of the resonance frequency of the vibrator 30 is reached is a sum of the time it takes to reach an amount of vibration of a predetermined ratio with respect to a saturation vibration amount of the starting frequency, and after that, the time it takes to reach a steady amount of vibration for the resonance frequency. Therefore, the startup time until reaching an amount of vibration of a predetermined ratio with respect to a saturation vibration amount of the starting frequency can be shortened by using a starting frequency that differs from the resonance frequency, and the startup time until reaching a steady amount of vibration at the resonance frequency of the vibrator 30 can be reduced.

The control method for a vibration generator and the vibration generator of the present invention are not limited to the above-described embodiment, and appropriate transformations, modifications, and the like can be made. For example, in the above-described embodiment, a case was described in which the starting frequency at the time of startup was set to be higher than the resonance frequency, but the starting frequency may also be set to be lower than the resonance frequency.

Moreover, in the above-described embodiment, a case was presented in which the frequency at the time of startup was changed to shorten the startup time. However, in addition to this, along with changing the frequency at the time of startup, the drive voltage can also be instantaneously increased for driving. Through this, the startup time can be more effectively shortened.

What is claimed is:

1. A control method for a vibration generator, the vibration generator comprising:
    a fixed part around which a coil is wound;
    a movable part having a magnet;
    a bridge part movably supporting the movable part; and
    a power supply unit which applies an alternating current of a predetermined frequency to the coil,
    wherein the power supply unit starts at the time of startup by the alternating current with a starting frequency which differs from a resonance frequency of the movable part, and the power supply unit changes the frequency of the applied alternating current to the resonance frequency of the movable part when the amount of vibration at the starting frequency reaches a predetermined ratio with respect to a saturation vibration amount of the resonance frequency.

2. The control method for a vibration generator according to claim 1, wherein the starting frequency is larger than the resonance frequency.

3. The control method for a vibration generator according to claim 1, wherein the frequency of the alternating current is changed to the resonance frequency of the movable part before the amount of vibration at the starting frequency reaches the saturation vibration amount.

4. A vibration generator comprising:
    a fixed part around which a coil is wound;
    a movable part having a magnet;
    a bridge part movably supporting the movable part; and
    a power supply unit for inputting at the time of startup an alternating current applied to the coil at a starting frequency which differs from a resonance frequency of the movable part, and changing the frequency of the applied alternating current to the resonance frequency of the movable part when the amount of vibration at the starting frequency reaches a predetermined ratio with respect to a saturation vibration amount of the resonance frequency.

* * * * *